O. ZERK.
SELF LUBRICATING SPRING BOLT.
APPLICATION FILED DEC. 31, 1912.

1,255,267.

Patented Feb. 5, 1918.

WITNESSES:
Justin W. Macklin
R. L. Bruck

INVENTOR:
Oscar Zerk,
BY Albert H. Bates,
ATTY

UNITED STATES PATENT OFFICE.

OSCAR ZERK, OF CLEVELAND, OHIO, ASSIGNOR, BY MESNE ASSIGNMENTS, TO GEORGE BOWEN, OF AUBURN, NEW YORK.

SELF-LUBRICATING SPRING-BOLT.

1,255,267.  Specification of Letters Patent.  Patented Feb. 5, 1918.

Application filed December 31, 1912.  Serial No. 739,581.

*To all whom it may concern:*

Be it known that I, OSCAR ZERK, a subject of the Emperor of Austria, residing at Cleveland, in the county of Cuyahoga and State of Ohio, have invented a certain new and useful Improvement in Self-Lubricating Spring-Bolts, of which the following is a full, clear, and exact description, reference being had to the accompanying drawings.

This invention relates to bolts for connecting the leaves or shackles of automobile springs, and its object is to provide a simple and attractive bolt for this purpose which shall contain a reservoir for lubricant and be provided with means whereby such lubricant is fed to the wearing surfaces as needed, and distributed thereon. The old system of attaching a grease cup to the end of a spring bolt has been unsatisfactory because the operator was very liable either to force too much grease into the bolt cavity, or, would forget to feed the grease when required, and the bolt would become dry. Furthermore, the projecting grease cups are unsightly in appearance and add to the expense of the bolt.

In the present invention I provide a bolt having a bore in one end, which, in use, is closed by a cap screw, the head of which takes the place of the usual nut. A radial hole leads from this bore to the wearing surface of the bolt and a felt wick occupying this hole and spring pressed outwardly, feeds the lubricant gradually and continuously, as needed. Means are provided to prevent the bolt turning and maintain the radial hole extending upwardly, so that the oil will not run out. A suitable lock is also provided, if desired, for the cap screw or nut.

The features mentioned and others which contribute to the efficiency of my invention will be hereinafter more fully described, and the essential characteristics will be summarized in the claims.

Figure 1:
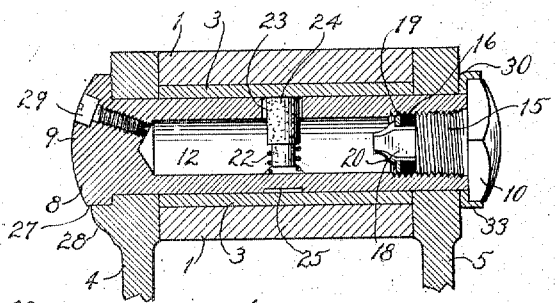
Figure 4:
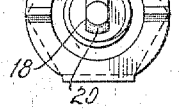
Figure 3:
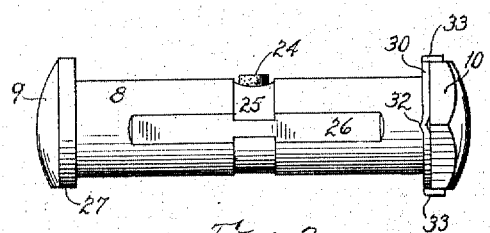
Figure 5:
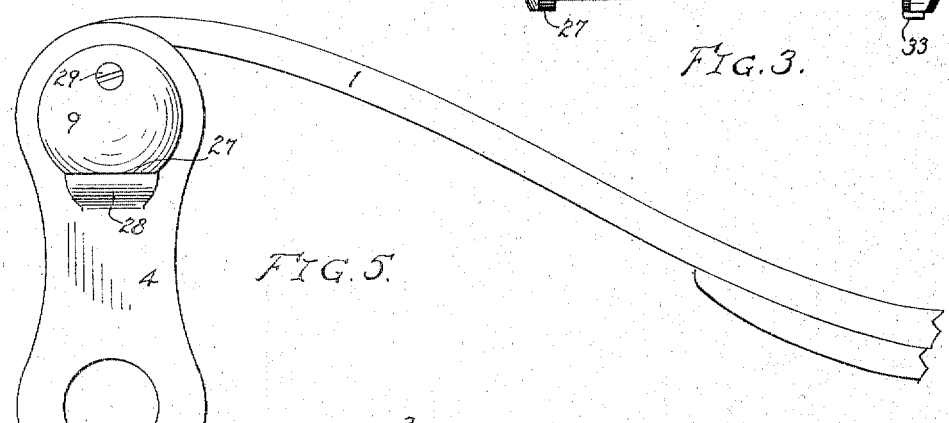
Figure 2:
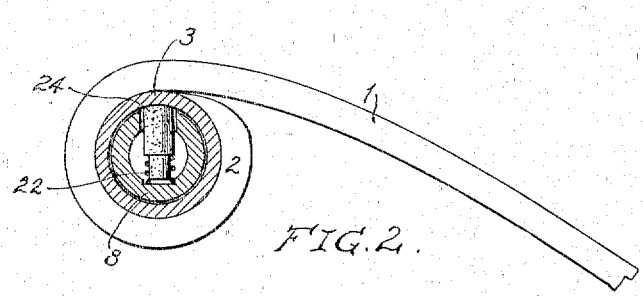

In the drawing, Figure 1 is a vertical axial section through my spring bolt in place in the eye of the spring between two shackle ears or plates, portions of which are shown; Fig. 2 is a transverse vertical section of the same; Fig. 3 is a side elevation of the spring bolt removed; Fig. 4 is an inner end view of the cap screw or nut, together with its lock; Fig. 5 is an end view of the bolt in place in the shackle and eye of the spring.

Referring to the parts by numerals, 1 indicates the leaf of an automobile spring and 2 the curled end thereof making an eye for receiving the bolt. In this eye is a bearing sleeve 3 snugly fitting the eye. 4 and 5 indicate two shackle plates, or arms of a single shackle, according to the construction, or these shackle plates may be ears on another spring member, as is well understood. 8 indicates the bolt which occupies alined openings in the two shackle members and the intermediate sleeve 3. One head of the bolt 9 is rigid and integral therewith, while the other, 10, consists of a cap screw screwing into the bolt having an overhanging head which takes the place of the usual nut. Such construction pivotally connects the spring leaf 1 with the shackle members, as will be understood.

The bolt 8 is of a comparatively large diameter, to provide a large bearing surface, and has internally a bore 12 extending from one end well toward the solid head 9. This bore is normally closed at the other end by the threaded shank 15 of the cap screw 10. To make a tight joint I mount on the inner end of this screw shank a leather or other elastic washer 16 which has a threaded periphery but is slightly larger than the shank 15, so that it makes a very tight connection with the bore, the bore being threaded internally from its free end to accommodate the bolt shank and washer. The washer is carried on a flattened stud 18 extending from the shank 15. The flattened side of this stud prevents the washer turning. A thin metal washer 19 surrounds the stud and lies against the washer and the end portion of the stud is peened over after the washers are in place, as shown at 20, and thus the leather is held tightly on the shank.

Extending through the wall of the bolt at its center is a radial hole 23. Occupying this hole and extending into the bore is a wick or porous plug 24 preferably of felt. This plug is pressed outwardly by a helical compression spring 22 surrounding a reduced portion of the plug and seating at its lower end on a flattened space in the wall of the bore.

The outer end of this felt plug 24 presses against the bearing sleeve 3 and thus serves to carry oil thereto, as needed, by capillary attraction. To properly distribute the oil I make a shallow peripheral groove 25 about the bolt; and, at one or more points along the bolt, I make communicating longitudinal shallow grooves 26. The longitudinal grooves are no longer than the eye 3 and serve to distribute the oil to the sleeve 3 without carrying it to unnecessary portions of the structure.

To keep the oil hole 23 at the top, so that the oil will not leak out, I flatten one side of the bolt head 9, as shown at 27, and I provide on the shackle plate 4 a suitable boss 28 to engage this flattened portion and prevent the bolt turning. The bolt is filled with oil by means of a suitable opening through the solid head 9, this opening being closed in use by a screw 29 screwing thereinto and terminating preferably flush on its outer face with the face of the head.

The leather washer 16 makes such a tight connection with the internal thread of the bolt that it acts as a lock to hold the cap screw, acting as a nut, in place. If desired, however, I may provide a special nut lock for this cap screw, and a lock for this purpose is shown in the drawing and designated 30. It consists of a washer surrounding the bolt and clamped between the head of the cap screw and the shackle plate 5, the washer having one or more projections 32 formed to enter depressions in the side face of the shackle plate and being provided with ears 33 which lie in the plane of the washer when the parts are assembled, but, in use, are bent over onto flat sides of the nut head to hold it against rotation. This makes a simple and secure lock.

Inasmuch as the lubricant is only taken from the reservoir in the bolt as needed, it will last for a very long time. In fact the bolt may carry a year's supply of oil at one filling. The expense of operation is, therefore negligible. The bolt is very strong. Its bearing surfaces are large, and the oil is distributed to the points where needed and the rotation is confined to the points which are lubricated. On account of the continuous lubrication and the large bearing surface, the bolt will out-wear the car to which it is applied. It should be noted also that, by reason of the internal nut and the absence of threads on the outside of the bolt, the shackle has a full bearing surface. The neatness of appearance is also a feature of this bolt. In fact, notwithstanding its self-lubricating character, it is far neater in appearance than a solid bolt.

Having thus described my invention, what I claim is:

1. The combination of a hollow bolt having an oil cavity in the interior thereof, an opening leading from said cavity through the periphery of the bolt, the opening being of less size than the cavity whereby the cavity constitutes an oil reservoir, a capillary plug in the opening and extending into the cavity and being of less size than the cavity whereby the plug does not fill the cavity, and a spring pressing the plug outwardly, substantially as and for the purpose set forth.

2. The combination of a hollow bolt having an oil cavity extending lengthwise thereof and an opening extending radially therefrom through the periphery of the bolt, a capillary plug located in the opening and extending substantially radially into the oil cavity and located remote from an end of the oil cavity, and a spring pressing at one end against the plug and at its other end on the wall of the oil cavity diametrically opposite the outlet opening, substantially as and for the purpose specified.

3. The combination of a hollow bolt comprising a hollow body closed at one end, a cap screw threading into the other end of the body, and an elastic washer carried by the cap screw within the bolt and engaging the internal threads within the bore of the bolt, substantially as and for the purpose specified.

4. A self-lubricating spring bolt comprising a hollow tubular body at one end, a cap screw threading into the other end of the body and including a threaded shank, an overhanging head and reduced shank projecting from the threaded shank, and an elastic washer mounted on the reduced shank, substantially as and for the purpose set forth.

5. The combination of a tubular bolt having a head rigid therewith, a removable head having a screw threaded engagement with the bolt, an opening through the peripheral wall of the bolt, a porous plug occupying such opening, and arranged substantially radially with the axis of the bolt and a spring pressing said plug outwardly the spring being arranged in the bolt and radially relatively to the axis thereof, substantially as and for the purpose described.

6. In a self-lubricating spring bolt, the combination of a hollow bolt, the cavity of which opens through one end thereof, the hollow bolt also having an opening through the periphery thereof a porous plug arranged in the opening, a spring pressing the plug outwardly and arranged in line with said opening and radially relatively to the axis of the bolt, and a plug secured in and closing the open end of the hollow bolt and having a head serving as a head for the bolt, substantially as and for the purpose specified.

7. In a device of the character described, the combination of a bolt having a tubular body with a solid head on one end and an internal thread adjacent to the other end, a cap screw screwing into such threaded portion and having an overhanging head adapted to act as a nut, and an elastic washer carried by the cap screw within the bolt in position to engage the wall of the bore of the bolt.

8. In a spring bolt, the combination of a tubular body and a head made integral therewith, the body being internally threaded near its free end, a cap screw screwing into such threaded end and having a projecting head, an elastic packing carried on the inner end of the cap screw and adapted to tightly engage the thread, and a passage for lubricant from the interior of the bolt to the exterior.

9. In a spring bolt, the combination of a tubular body having a head, the body being internally threaded near its free end, a cap screw screwing into such threaded end and having a projecting head, an elastic packing carried on the inner end of the cap screw and adapted to tightly engage the thread, a passage for lubricant from the interior of the bolt to the exterior, and a wick occupying said passage and adapted to carry lubricant for capillary action from the interior to the exterior of the bolt.

10. The combination of a bolt having at one end a solid head and provided with an internal bore extending from its solid head to the other end, the bore being internally threaded adjacent to such other end, a cap screw screwing into such threaded end and having a projecting head, an oil opening from the interior of the bolt to its exterior, a wick in said opening, a peripheral groove about the exterior of the bolt at the exit of such opening, and a longitudinal groove on the surface of the bolt communication with the peripheral groove.

In testimony whereof, I hereunto affix my signature in the presence of two witnesses.

OSCAR ZERK.

Witnesses:
ALBERT H. BATES,
BRENNAN B. WEST.